US005735568A

United States Patent [19]
Arnold

[11] Patent Number: 5,735,568
[45] Date of Patent: Apr. 7, 1998

[54] CAB-SLEEPER ASSEMBLY

[75] Inventor: Wesley Milton Arnold, Kelowna, Canada

[73] Assignee: Western Star Trucks, Inc., British Columbia, Canada

[21] Appl. No.: 792,623

[22] Filed: Jan. 31, 1997

[51] Int. Cl.⁶ ..................... B60P 3/32
[52] U.S. Cl. ............ 296/190; 296/166; 180/89.12
[58] Field of Search .................. 296/164, 165, 296/166, 180.2, 190, 197; 180/89.13

[56] References Cited

U.S. PATENT DOCUMENTS

| | | |
|---|---|---|
| 3,000,665 | 9/1961 | Reeves. |
| 3,485,522 | 12/1969 | Reinarts. |
| 3,554,596 | 1/1971 | Le Fevre. |
| 3,966,009 | 6/1976 | Meacock, II et al. |
| 4,036,519 | 7/1977 | Servais et al. |
| 4,121,684 | 10/1978 | Stephens et al. |
| 4,351,554 | 9/1982 | Miller ................ 296/164 |
| 4,422,685 | 12/1983 | Bonfilio et al. ........... 296/197 |
| 4,605,257 | 8/1986 | Lang et al. ............ 296/190 |
| 4,775,179 | 10/1988 | Riggs ................ 296/180.2 |
| 4,787,670 | 11/1988 | Bentz ................ 296/190 |
| 5,076,639 | 12/1991 | Jewett et al. ........... 296/183 |
| 5,150,942 | 9/1992 | Fujan et al. ............ 296/190 |
| 5,310,239 | 5/1994 | Koske et al. ........... 296/190 |
| 5,560,673 | 10/1996 | Angelo ................ 296/190 |

FOREIGN PATENT DOCUMENTS

| | | |
|---|---|---|
| 1151010 | 1/1958 | France. |
| 2812021A1 | 9/1979 | Germany. |
| 3718746A1 | 4/1987 | Germany. |
| 2166094 | 4/1986 | United Kingdom. |

*Primary Examiner*—Jesus D. Sotelo
*Attorney, Agent, or Firm*—Christensen O'Connor Johnson & Kindness PLLC

[57] ABSTRACT

The invention provides a unitized cab-sleeper assembly that may be mounted on a truck-tractor chassis. The cab-sleeper assembly includes lightweight monocoque cab and sleeper modules that are mechanically coupled in a unique manner to achieve a unitary structure with great structural integrity, while also providing a comfortable ride, when mounted to a truck-tractor chassis. The cab-sleeper assembly includes in certain embodiments a unique ladderlike subframe, which consists of mechanically coupled separate subframes of the cab and sleeper modules. In other embodiments, the subframe is not ladderlike, and the cab-sleeper floors may be fabricated of a composite material over a lightweight core. Moreover, the rear of the cab is coupled to the front of the sleeper by concealed couplings, located at least at each corner of the cab-sleeper interface. In an important feature of the invention, each of the pair of sleeper mounts of the cab-sleeper assembly is located about midway along the length of the sleeper.

19 Claims, 14 Drawing Sheets

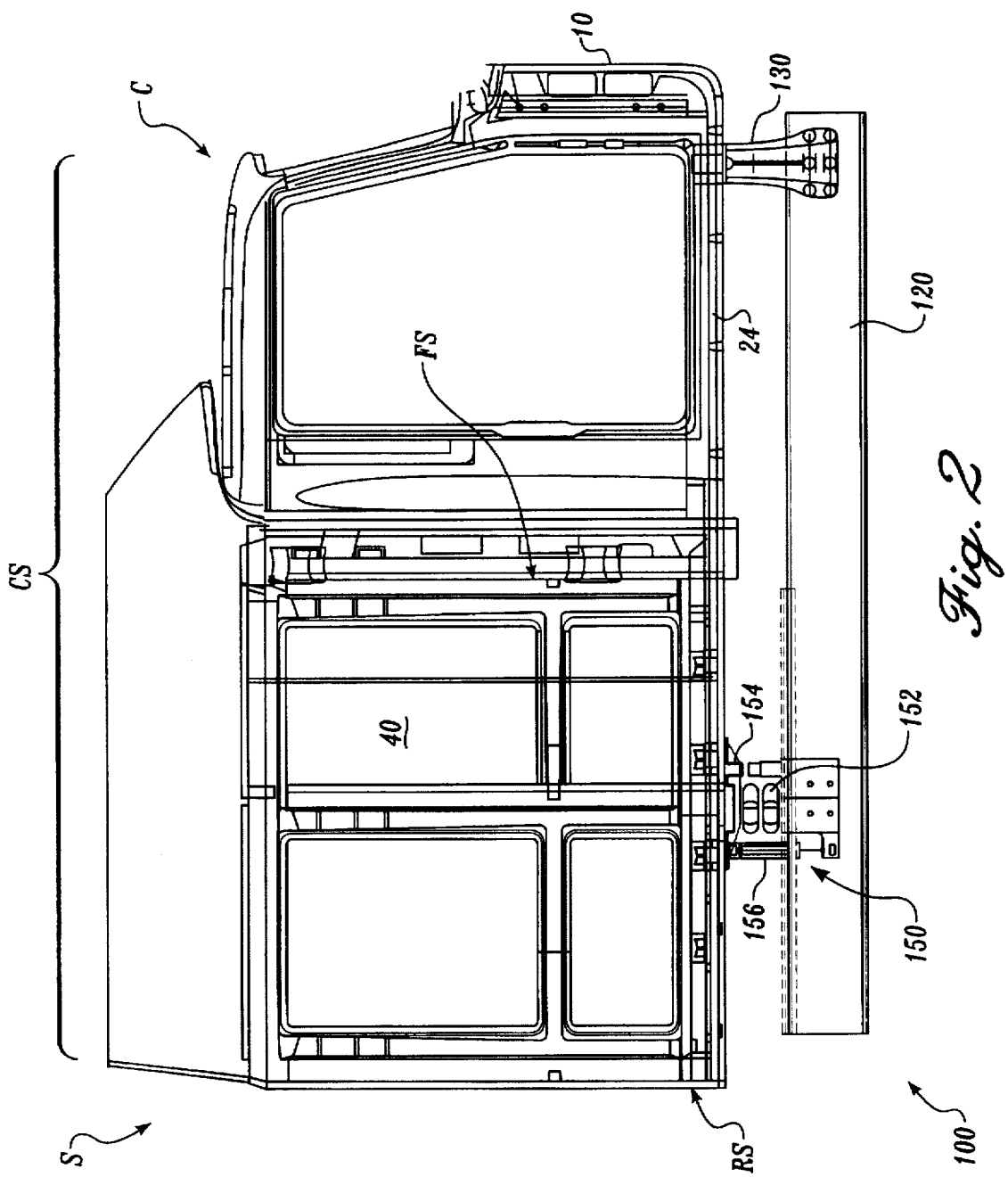

1

CAB-SLEEPER ASSEMBLY

FIELD OF THE INVENTION

The invention relates to cab-sleeper modules used in truck-tractor and other vehicles. More specifically, the invention provides an assembly that includes a sleeper module joined to a cab module to form an integral unit.

BACKGROUND OF THE INVENTION

Long haul trucking plays a major role in interstate commerce. For economic and convenience reasons, long haul truck-tractor vehicles are now increasingly commonly equipped with attached sleeping accommodations, or sleeper modules.

Modular design of cab and sleeper modules is desired for maximum flexibility in production and in matching cab-sleeper arrangements to particular tasks. For example, for a short, overnight haul, a small sleeper with not much more than a bunk may be sufficient, whereas on a coast-to-coast haul, a larger, more fully appointed sleeper module including added convenience features may be desired.

Traditionally, modular cab and sleeper modules are designed to be separately attachable to the chassis of the truck-tractor vehicle using at least two sets of mounts for each unit. Due to the relatively short distances between mounting sites and the relatively small moments of inertia of each unit compared to a combined unit, these separately-mounted modular designs tend to experience significant undesired motion. Thus, integrated cab-sleeper modules, mounted to the chassis of the truck-tractor vehicle at maximally-spaced attachment points were preferred for ride comfort. For example, U.S. Pat. No. 5,310,239 ("the '239 patent") describes a "plate on frame" design that is based on maximizing the distance between the front and rear mounts for a comfortable ride. Thus, the sleeper mount is proximate the rear of the sleeper, and preferably beneath the rear wall. A monocoque Mack CH600 design, illustrated in a sales brochure of 1989, has the sleeper mounts toward the front or mid-section of the sleeper. The Mack monocoque design has the benefit of lower weight over the '239 patent's plate and frame design. Both the '239 patent and the Mack CH600 appear to eliminate the need for a flexible gasket between the cab and sleeper that is subject to deterioration, and resultant leakage in use. However, the Mack design requires a large number of huck bolts that attach the cab to the sleeper, making separation of modules burdensome. The '239 patent's design, in addition to being heavy, has exposed couplings that attach the cab to the sleeper. There is a need for a lightweight cab-sleeper design for a truck-tractor with a readily detachable sleeper that is yet a unified structure with a comfortable ride.

SUMMARY OF THE INVENTION

The invention provides a modular cab-sleeper assembly of lightweight monocoque design that is a unified structure with the sleeper unit fastened to a cab unit. Notwithstanding the separately produced sleeper and cab units, the assembled cab-sleeper forms an integral unit and provides a comfortable ride.

In one important feature of the invention, the cab-sleeper assembly is mounted to a truck-tractor chassis by at least two pairs of laterally spaced-apart mounts. The frontal (or cab) mounts are preferably located in the vicinity of the front end of the cab, and preferably near a node point of a frame bending mode to reduce undue motion into the cab, while the aft (or sleeper) mounts are located about midway along the length of the sleeper to reduce bending loads on the entire cab-sleeper assembly. This preferred positioning of the mounts, which does not maximize the distance between the front and aft mounts, is a departure from other teachings in the art and provides significant benefits in the monocoque design. It has been found that, by moving the mounts away from the rear end of the unit, bending moments on the structure are reduced, thereby reducing the need for weighty structural reinforcement.

In another important feature of the invention, the cab and the sleeper units are each of monocoque design providing the advantage of light weight. In one embodiment, the cab shell includes an integral subframe in its floor portion that provides structural rigidity. In a preferred embodiment, the subframe includes at least one, and preferably two parallel, longitudinal member extending substantially along the length of the cab, and at least one bracing member, or crosstie, extending laterally across the width of the cab. The rear end of the cab subframe is adapted for coupling to the front end of a subframe of a monocoque sleeper module. The monocoque sleeper module has a front end that is adapted for mounting to the aft end of the cab module. The sleeper module of this embodiment also includes a similar subframe in its floor portion.

In this embodiment of the cab-sleeper assembly of the invention, the cab module is fastened to the sleeper module by fastening the subframe of the cab to that of the sleeper, and coupling of the rear end of the cab to the forward end of the sleeper. Importantly, the cab and sleeper modules are optionally fastened to each other with weatherproofing gasket between, and without an intervening flexible accordion-like section of the type used in the prior art to absorb relative movement of cab and sleeper, when they are in use on the chassis of a truck-tractor.

Another important feature of the invention provides the flexibility to produce separately manufactured cab and sleeper units and assemble them to form an integral, unitary structure on the chassis.

In alternative embodiments, the cab and sleeper modules have composite floor panels (for example, composite covering an aluminum honeycomb structural panel) rather than the subframes described above. When the floor is formed of a composite panel, the structure of the subframes may be simplified by removing all or some of the crossties but retaining the longitudinal members. Thus, the cab and sleeper modules (or "sections") are coupled together by mechanically fastening the ends of their respective longitudinal members together.

In another important aspect of the invention, the sleeper part of the assembly is adapted for mounting to the chassis of a truck-tractor vehicle by at least one pair of laterally spaced-apart mounts. Each of the mounts preferably includes at least one pneumatic rubber ring. The mounts are attached to the sleeper along its outboard sides, on the underside of the sleeper, and about midway along the length of the sleeper. The aft mounts should be relatively soft in order to decouple the cab-sleeper assembly from the chassis so that undue loads and motions are not transferred to the cab-sleeper. The cab part of the assembly, on the other hand, is adapted for mounting to the truck-tractor chassis by a pair of laterally spaced-apart mounts, preferably located in the vicinity of the front end of the cab near a node point of a frame bending mode, and on either side of the cab module. The frontal mounts should be relatively stiff in order to reduce undue motion of the cab with respect to the chassis to maintain interfaces with mechanical structures such as the steering shaft, clutch linkage, wire harnesses, and air connections.

In a further important aspect of the invention, the rear of the cab module is mechanically fastened to the front of the sleeper module by at least two pairs of couplers. In an embodiment of the cab-sleeper assembly that includes laterally spaced-apart walls between the cab and sleeper modules that define an accessway from cab to sleeper, the walls are preferably made up of two panels each. In this embodiment, each coupler includes a pair of cooperating components, one component adapted for concealed placement between inner and outer panels of the cab walls at the rear of the cab, and its cooperating component adapted for concealed placement between inner and outer panels of the sleeper walls at the front of the sleeper. Each coupler works to distribute loads into the inner panels of the monocoque design. A fastener, such as a nut and bolt or stud or pin assembly, extends through the cooperating components of each coupler and through the panels of the cab and the sleeper to securely and substantially immovably fasten the rear portion of the cab to the front portion of the sleeper directly, and without an intervening flexible section (aside from an optional weatherproofing strip) to absorb relative motion between cab and sleeper that may arise, when they are in use on a truck-tractor chassis.

In other embodiments, where the walls between the cab and sleeper modules are not present, the couplers extend through matching aligned brackets capable of bearing loads, that are attached near the corners of the cab section and the sleeper modules, so that the cab-sleeper unitary assembly is readily formed by fastening these brackets together, without need for an intervening flexible section to absorb relative motion between the cab and sleeper modules, but with an optional weatherstrip between the sections. Thus, the monocoque cab and sleeper modules are joined together into a unitized cab-sleeper assembly of the invention through concealed couplers, and joined-together subframes.

BRIEF DESCRIPTION OF THE DRAWINGS

The nature and advantages of the present invention will become more readily apparent to those skilled in the art from the following detailed description, when taken in conjunction with the accompanying schematic, not to scale, drawings, in which:

FIG. 2 is a side elevation view of an embodiment of the modular cab-sleeper assembly of the invention depicting the location of the cab and sleeper and mounts when it is mounted to a truck-tractor chassis;

FIG. 5E is a detail perspective view of the lateral restraint rod, pneumatic rubber ring assembly, travel limiting device and shock absorbers of an embodiment of the present invention.

DETAILED DESCRIPTION OF THE PREFERRED EMBODIMENT

The present invention provides a unitized cab-sleeper assembly for mounting to a truck-tractor chassis, or another vehicle chassis, that is of modular design, incorporating a monocoque cab and monocoque sleeper fastened together in a unique manner. Moreover, the cab-sleeper assembly of the invention is adapted for mounting to a vehicle chassis using a minimum of two pairs of laterally spaced-apart mounts: a first pair of mounts for the cab module, and a second aft pair of mounts for the sleeper module. The mounts for the cab section are located in the vicinity of the front end of the cab module, while the sleeper mounts are located in the vicinity of the midlength of the sleeper. Therefore, unlike the teachings of others, the cab-sleeper assembly of the invention does not seek to maximize the distance between the cab and sleeper mounts. Instead, as described in more detail below, the cab-sleeper assembly of the invention provides a comfortable ride, while minimizing bending stresses and other mechanical loads on the cab-sleeper assembly as a whole. Moreover, the monocoque cab and sleeper design provides a lighter weight assembly, and the use of concealed couplings between the cab and sleeper provides a more pleasing aesthetic appearance.

The attached figures illustrate examples of preferred embodiments of the invention, and do not limit the scope of the invention as described herein, and as described herebelow.

Figure 1A:
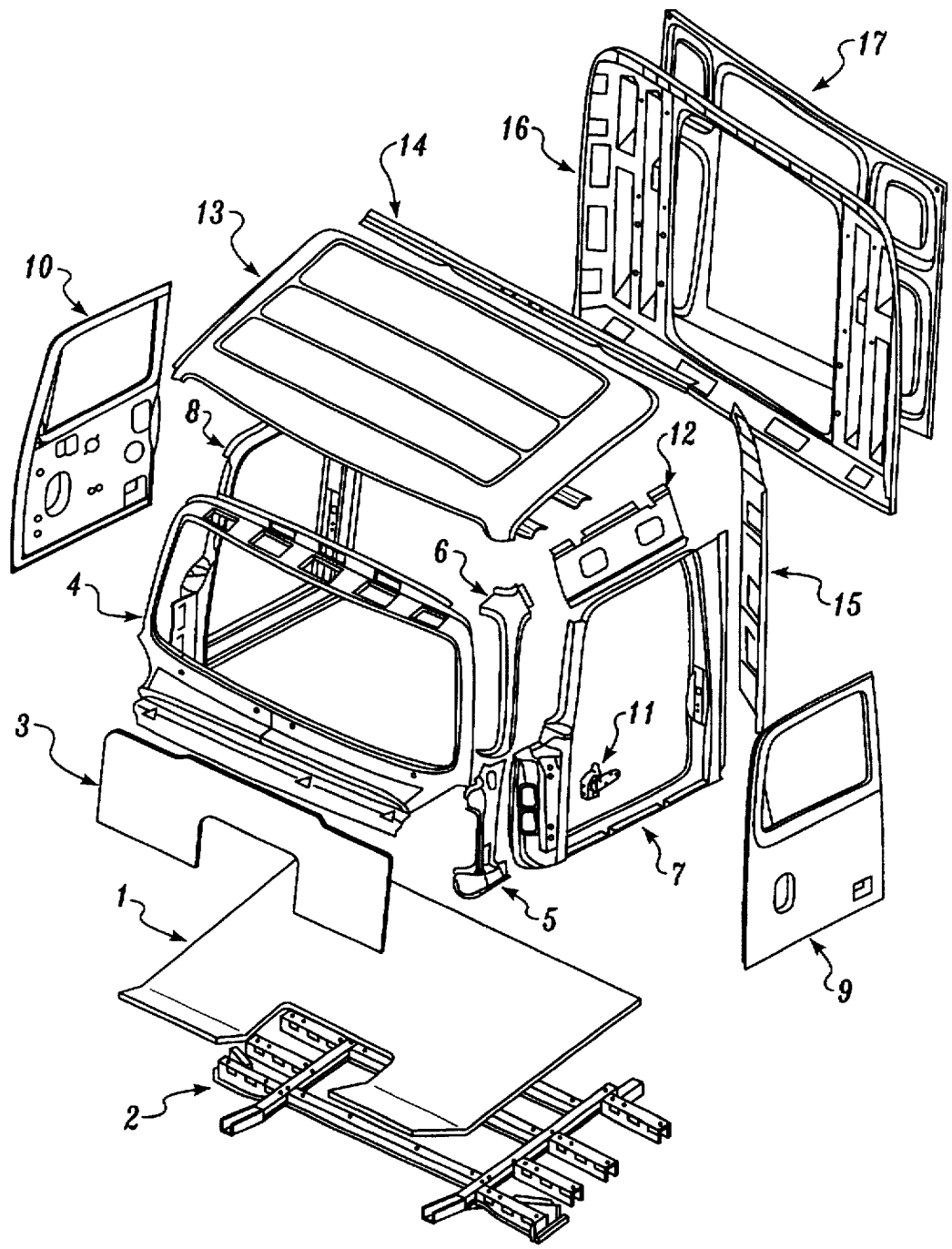
FIG. 1A is an exploded view of the cab of an embodiment of the invention.
Figure 1B:
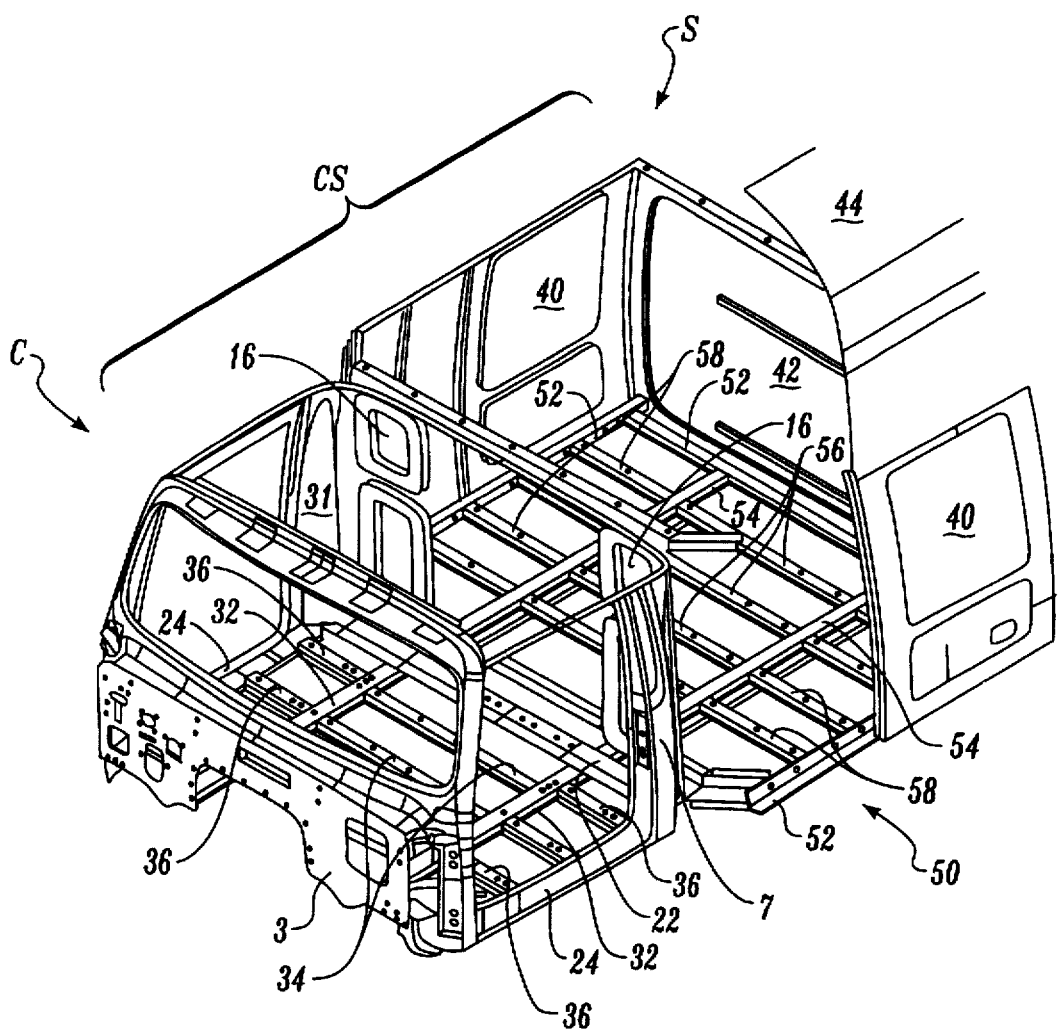
FIG. 1B is a three-quarter frontal perspective view of an embodiment of the invention with most of the outer shell cladding removed to show details of the monocoque design of the cab and the sleeper.

FIGS. 1A, 1B, and 2 illustrate an exemplary embodiment of a cab-sleeper assembly CS in accordance with the present invention, that includes a cab module C and a sleeper module S, attached to the aft portion of the cab module. In the particular example shown in FIG. 1A, the cab module C consists of a number of large panel assemblies which are welded together. More specifically, floor 1, having floor ladder subframe 2 therebelow, provides a base for cab module C. Firewall 3 is vertically located at the front of cab module C with windscreen surround 4 above firewall 3. A pair of A panel lower closers 5 and A panel upper closers 6 separate windscreen surround 4 from left bodyside panel 7 and from right bodyside panel 8. Left door 9 and right door 10 are pivotally connected to left bodyside panel 7 and right bodyside panel 8, respectively, by hinges 11. Cant rail 12 connects the upper portion of left bodyside panel 7 and right bodyside panel 8 to roof 13. Roof bow 14, located on the rear of roof 13, provides support for roof 13. An inner liner 15 connects to the rear portion of left bodyside panel 7 and another inner liner 15 connects to the rear portion of right bodyside panel 8. Roof 13 connects to inner rear panel 16 and outer rear panel 17; inner rear panel 16 and outer rear panel 17 forming the back of cab module C and allowing access to sleeper module S.

As shown in FIG. 1B, the floor portion 1 of the cab module C is substantially rectangular and framed by the fire wall 3 at its forward end; horizontal wall support bracket 22 extending laterally between and beneath the inner rear panel 16 and outer rear panel 17 at its rear end; and a pair of laterally spaced-apart horizontal longitudinally extending floor sills 24 that extend from the ends of the fire wall 3 aft toward opposite ends of the laterally extending rear wall bracket 22.

As shown in the example of FIGS. 1A and 1B, the floor portion 1 of the cab module C is braced and reinforced with a ladderlike subframe 2 (more clearly shown in FIG. 3E) that includes, in the example shown, a pair of horizontal, substantially parallel, longitudinally extending spaced-apart members 32 each having a front end mechanically attached in the vicinity of the front of the cab, and a rear end mechanically attached to the rear bracket 22 in the vicinity of a rear end of the cab. These substantially parallel members 32 are preferably maintained at their spaced-apart distances by a series of parallel horizontal lateral bracing crossties 34.

Clearly, other subframe arrangements are also possible, including crossing-over diagonal crossties, in the form of an "X." Preferably, in order to further enhance rigidity, the longitudinal members 32 are each braced and mechanically attached to side floor sills 24 by a series of parallel horizontal lateral outboard bracing members 36. Clearly, other types of brackets may also be used to form the reinforced subframe of cab module C.

The preferred sleeper modules of the invention, and its juxtaposition relative to the cab module C, is also exemplified in FIGS. 1B and 2. As seen more clearly in FIG. 1B, the sleeper module S is substantially a rectangular box-shape. The sleeper includes a pair of vertical laterally spaced-apart side walls 40, comprising inner and outer panels (40a and 40b, respectively, in FIG. 5A). A rear wall 42 extends between the rear edges of the side walls 40. The upper edges of the side walls 40 and the rear wall 42 are covered by a roof 44 to enclose the interior space of the sleeper module S, except for its front end. In one embodiment, a pair of vertical, laterally spaced, double-paneled front walls (sleeper front panel inner wall 95a and sleeper front panel outer wall 95b of FIG. 5C) of the sleeper module S are adapted for alignment with the inner rear panel 16 and outer rear panel 17 of the cab module C to form a pair of common double-paneled walls between the cab and the sleeper, with an accessway between. In other embodiments, the inner rear panel cab 16 and outer rear panel 17 and the front sleeper walls may be minimally-sized or nonexistent to provide a larger accessway.

Figure 3A:
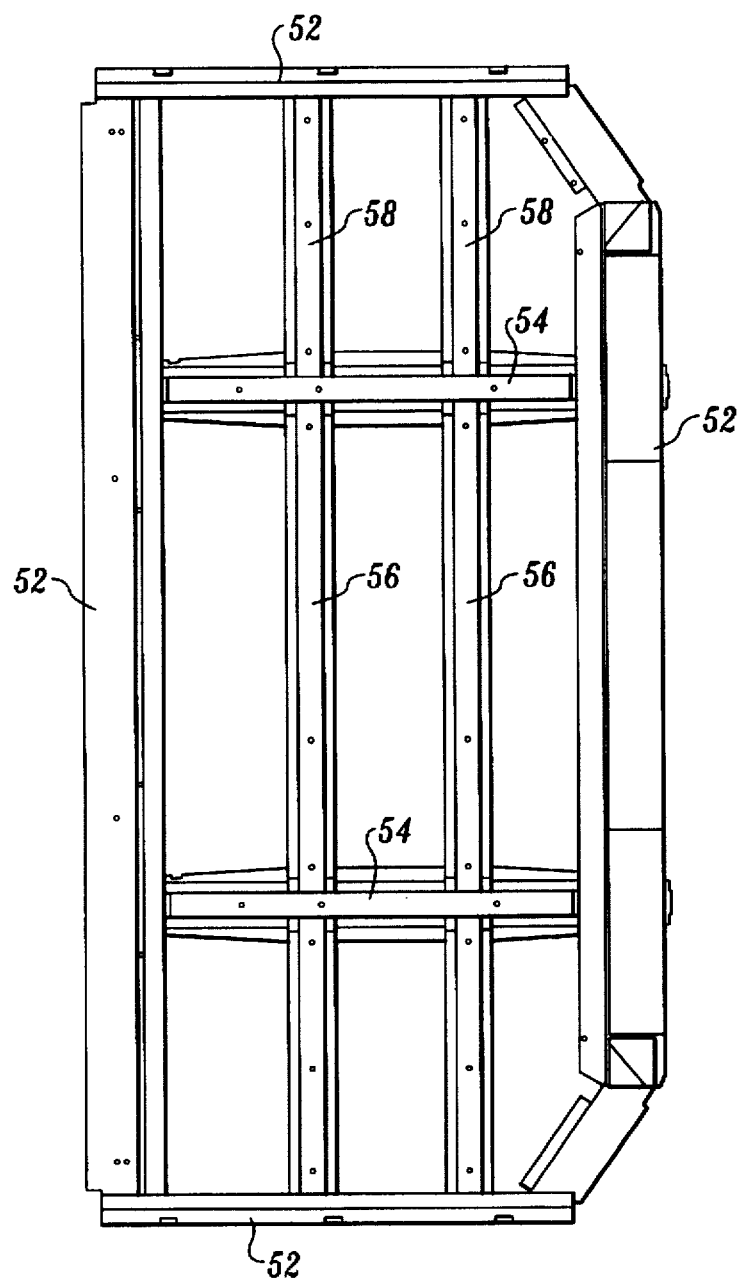
FIG. 3A is a plan view of the underside of an embodiment of a sleeper depicting the arrangement of longitudinal members and lateral cross-ties in the sleeper module Subframe according to the present invention.
Figure 3B:
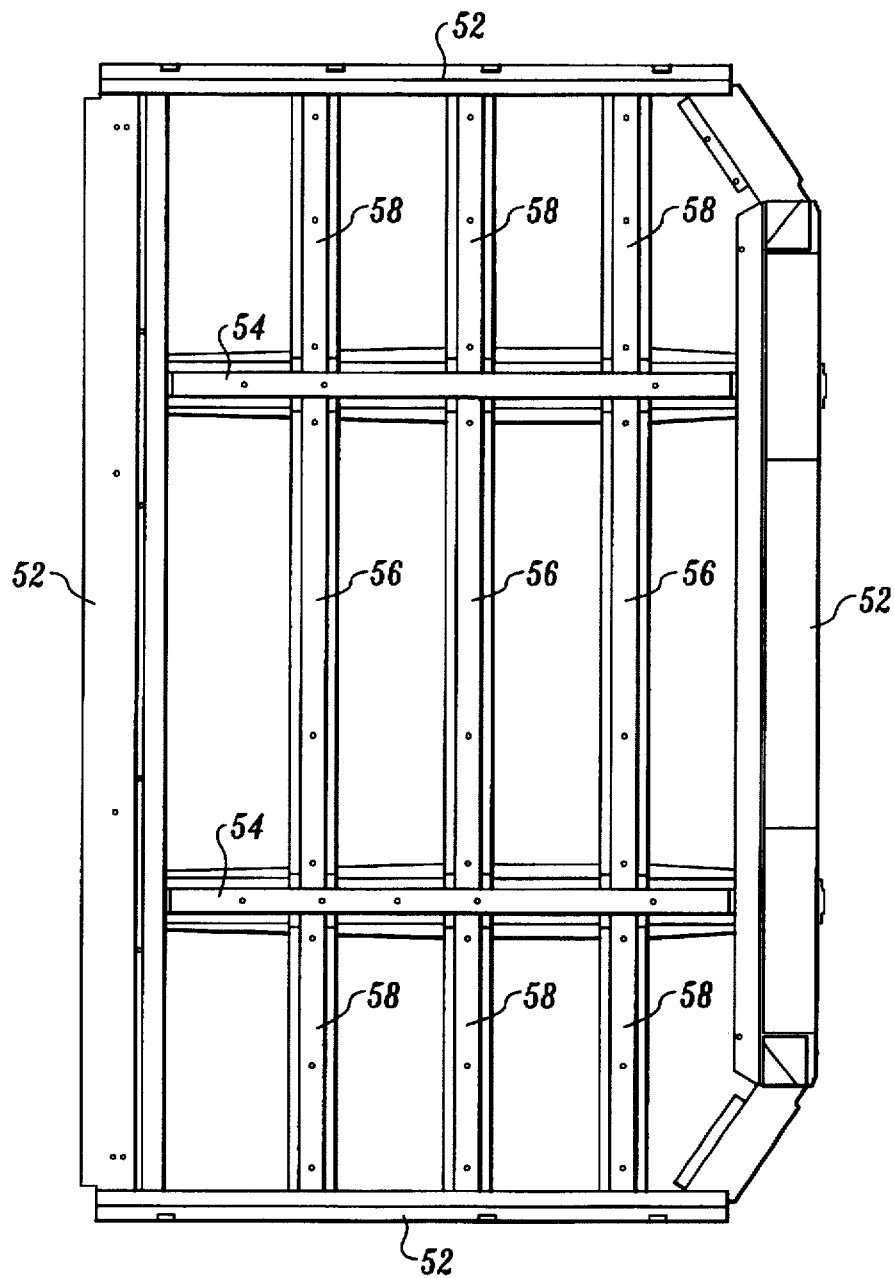
FIG. 3B is a plan view of the underside of an alternative embodiment of a sleeper depicting the arrangement of longitudinal members and lateral cross-ties in the sleeper module Subframe according to the present invention.
Figure 3C:
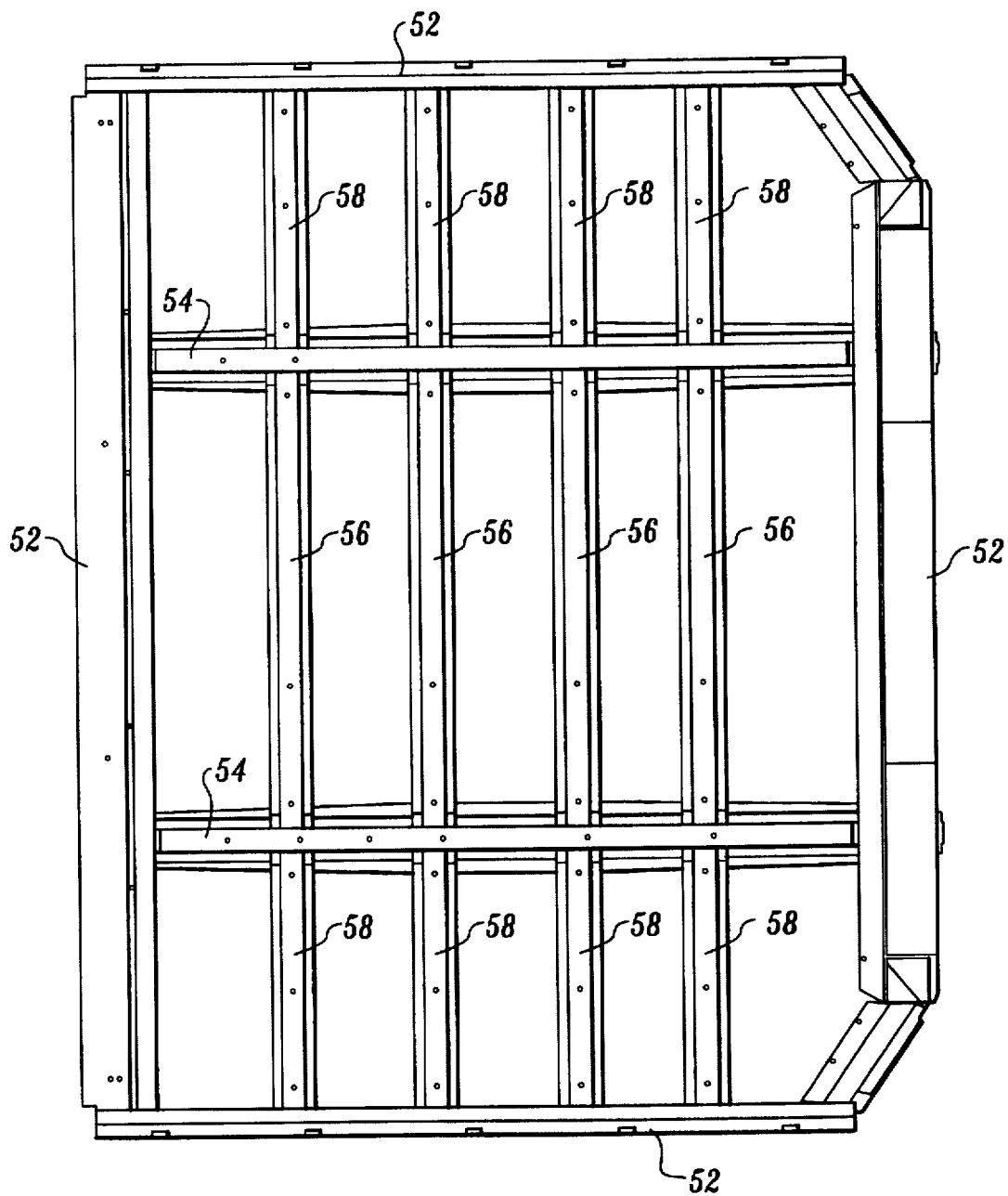
FIG. 3C is a plan view of the underside of another alternative embodiment of a sleeper depicting the arrangement of longitudinal members and lateral cross-ties in the sleeper module Subframe according to the present invention.

In accordance with an embodiment of the invention, the monocoque sleeper module S also includes a subframe in its floor section 50. In the embodiment exemplified in FIG. 1B (and shown in detail in FIGS. 3A–3C), the floor portion 50 includes a substantially rectangular horizontally oriented framework 52 around its perimeter within which is arrayed a ladder-like subframe that includes a pair of horizontal, substantially parallel, longitudinally extending spaced-apart members 54. As in the cab, these longitudinal members 54 are spaced apart by a series of parallel lateral crossties 56. The outboard sides of each member 54 are attached to the longitudinally extending sides of frame 52 by horizontal outboard bracing lateral crossties 58. Clearly, other support arrangements for the floor portion 50 may also be used. However, the arrangement which incorporates a pair of longitudinal members 54 is preferred, as will be explained below.

In accordance with the invention, the subframe of the cab module is attached to the subframe of the sleeper module, as explained below.

Figure 3D:
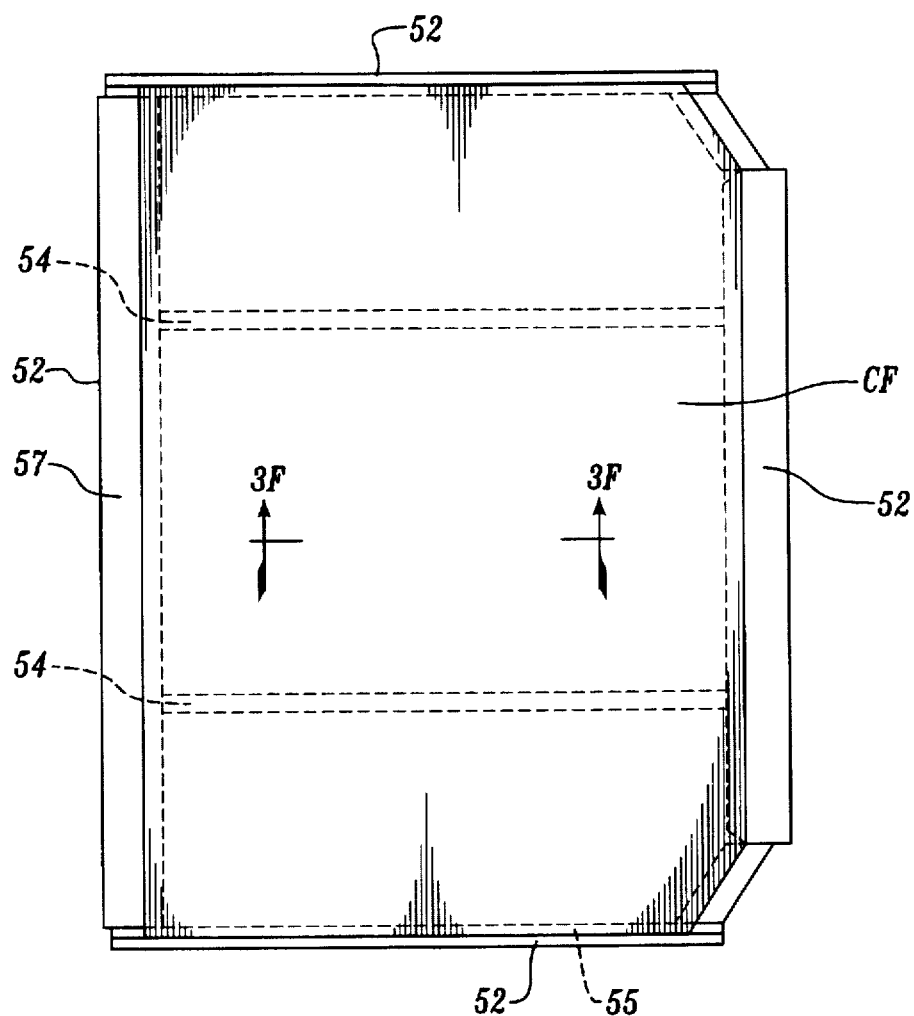
FIG. 3D is a plan view of the underside of another alternative embodiment of a sleeper depicting the arrangement of a composite floor on longitudinal members in the sleeper module Subframe according to the present invention.

FIG. 3D shows an alternative embodiment of a sleeper subframe including a composite floor CF supported on the surrounding framework 52 and a pair of longitudinal members 54. Preferably the frame 52 has a load-bearing sill 55 along its inner perimeter and the floor CF rests on the sill 55 and the members 54.

Figure 3F:
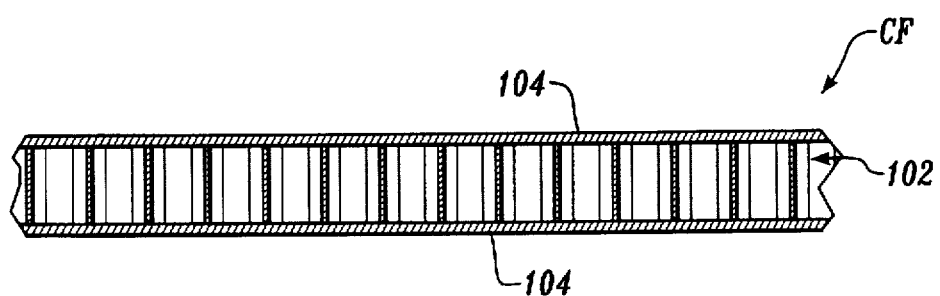
FIG. 3F is a cross-sectional view of a section of composite floor useful in the invention.

The composite floor CF may be fabricated with a core of aluminum honeycomb 102 covered on both sides with composite 104, as shown in FIG. 3F.

Figure 3E:
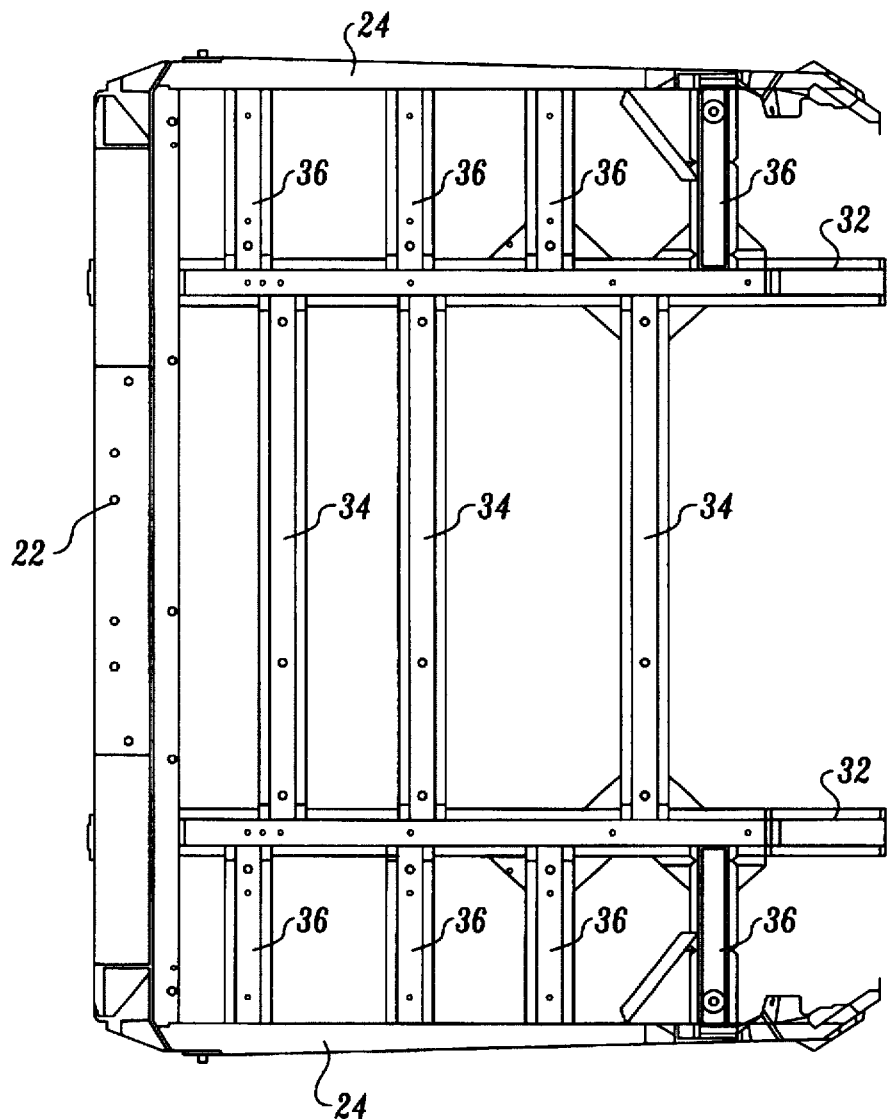
FIG. 3E is a plan view of the underside of an embodiment of a cab depicting the arrangement of longitudinal members and lateral cross-ties in the cab subframe according to the present invention.

FIG. 3E shows an embodiment of a ladderlike cab subframe including a pair of parallel longitudinally extending horizontal members 32 separated by, in this embodiment, three crossties 34. The subframe also includes four pairs of outboard bracing members 36, which are staggered with respect to the crossties 34, although such staggering this is not essential, and which extend from outboard sides of each member 32 to the side sills 24 of the cab floor frame. As in the case of the sleeper module, in other embodiments, the cab subframe may be fabricated of a composite as shown in FIGS. 3D and F.

Figure 4:
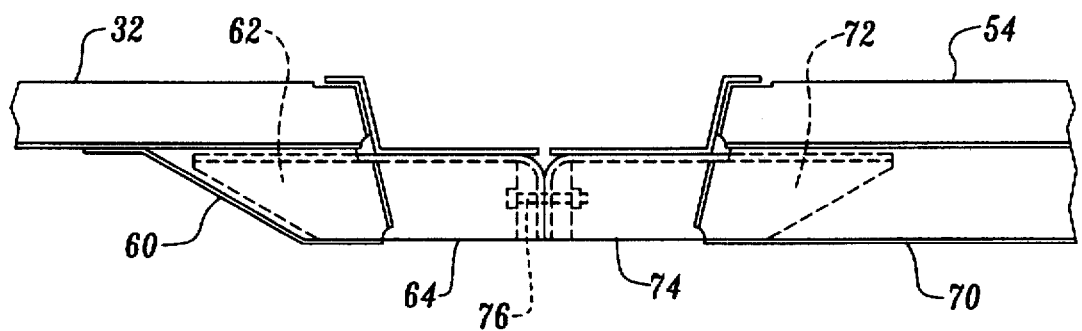
FIG. 4 is a side elevation view showing details of the mechanical connection between embodiments of longitudinal members of a cab and of a sleeper according to the present invention.

FIG. 4 is an illustrative example of the mechanical coupling between a rear end of a longitudinal member 32 of the cab with the front end of an aligned longitudinal member 54 of the sleeper. As shown, the aft end of the cab longitudinal member 32 has welded thereto a socket 60 for receiving one end 62 of a joining bracket 64. Likewise, the forward end of the longitudinal member 54 of the sleeper has welded thereto a socket 70 for receiving an end 72 of another joining bracket 74. The rear end of bracket 64 is mechanically fastened to the forward end of bracket 74 by a fastener 76 that extends through the ends of both brackets. Thus, coupling is achieved between the subframes of the cab module C and the sleeper module S.

As earlier explained, the cab module C and the sleeper module S are also joined together by preferably no more than two pairs of couplers each made up of at least two cooperating components, each of which are preferably concealed inside corners of the cab-sleeper assembly. While it is preferred that no more than two pairs of couplers are used to attach the cab to the sleeper (one set at each corner of the cab-sleeper interface), clearly more couplers can be used, although such additional couplers may be superfluous. Thus, in accordance with the invention, a coupler placed at each corner of the interface between the cab module C and the sleeper module S is preferably sufficient, in conjunction with the coupling together of the subframes of the cab and sleeper, to provide a rigid unitary cab-sleeper assembly.

Figure 5A:
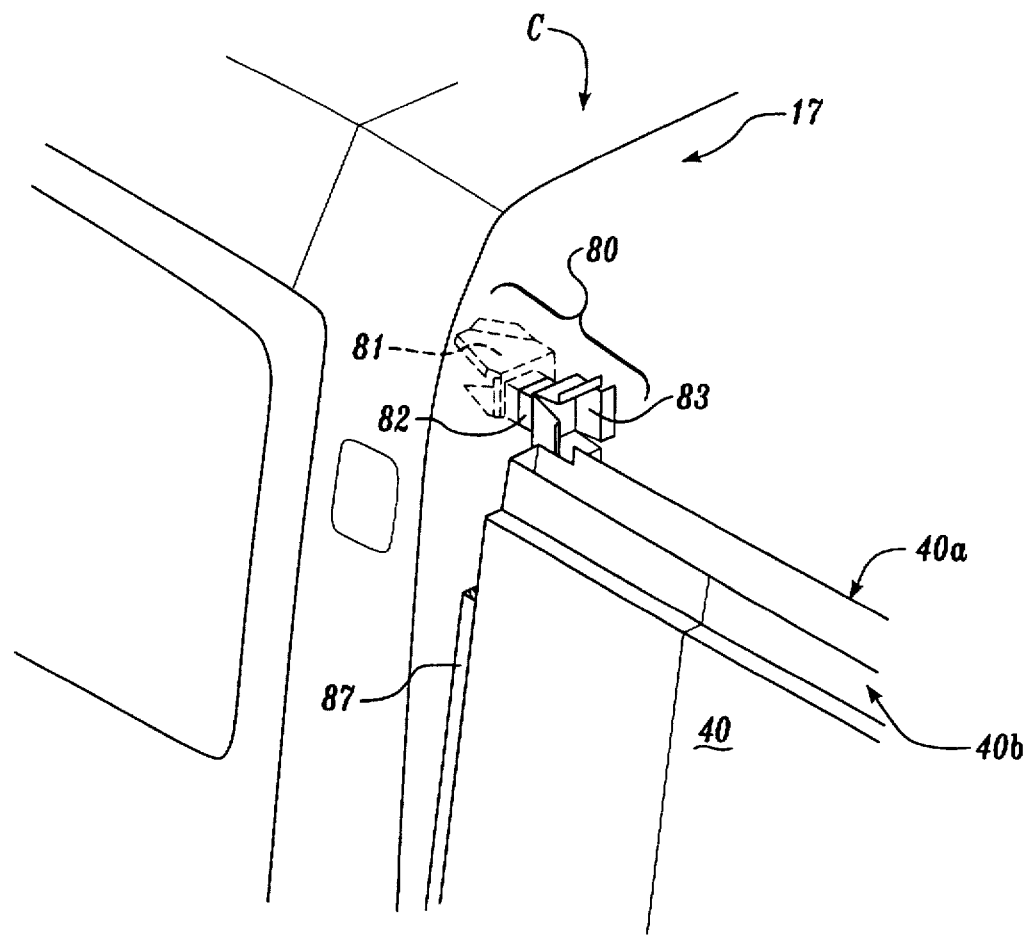
FIG. 5A is a three-quarter rear perspective view of an embodiment of the present invention showing a pair of upper coupling brackets fastening the cab to the sleeper, with portions of the outer panels removed.

Referring to FIG. 5A, depicting schematically a coupler 80 at an upper corner interface between the cab module C and the sleeper module S, it is readily apparent that the coupler 80 will be concealed. The cab-side cooperating component 81 of the coupler 80 is located inside the cab module C, and between inner rear panel 16 and outer rear panel 17 of the cab module C. Similarly, the sleeper-side component 83 is located between sleeper front panel outer wall 95a and sleeper front panel inner wall 95b of the sleeper module S, as shown in FIG. 5C. Components 81 and 83 are separated by a spacer 82 to permit clearance of a cab flange on the cab bodyside with a sleeper flange on the sleeper bodyside as described in more detail below in reference to FIG. 5C. A fastener 84, for example a nut and bolt, stud or pin, extends between components 81 and 83 to mechanically fasten the corner of the cab module C and sleeper module S together. This structure, or its equivalent, is duplicated on the other upper corner of the interface between the cab module C and the sleeper module S.

Figure 5B:
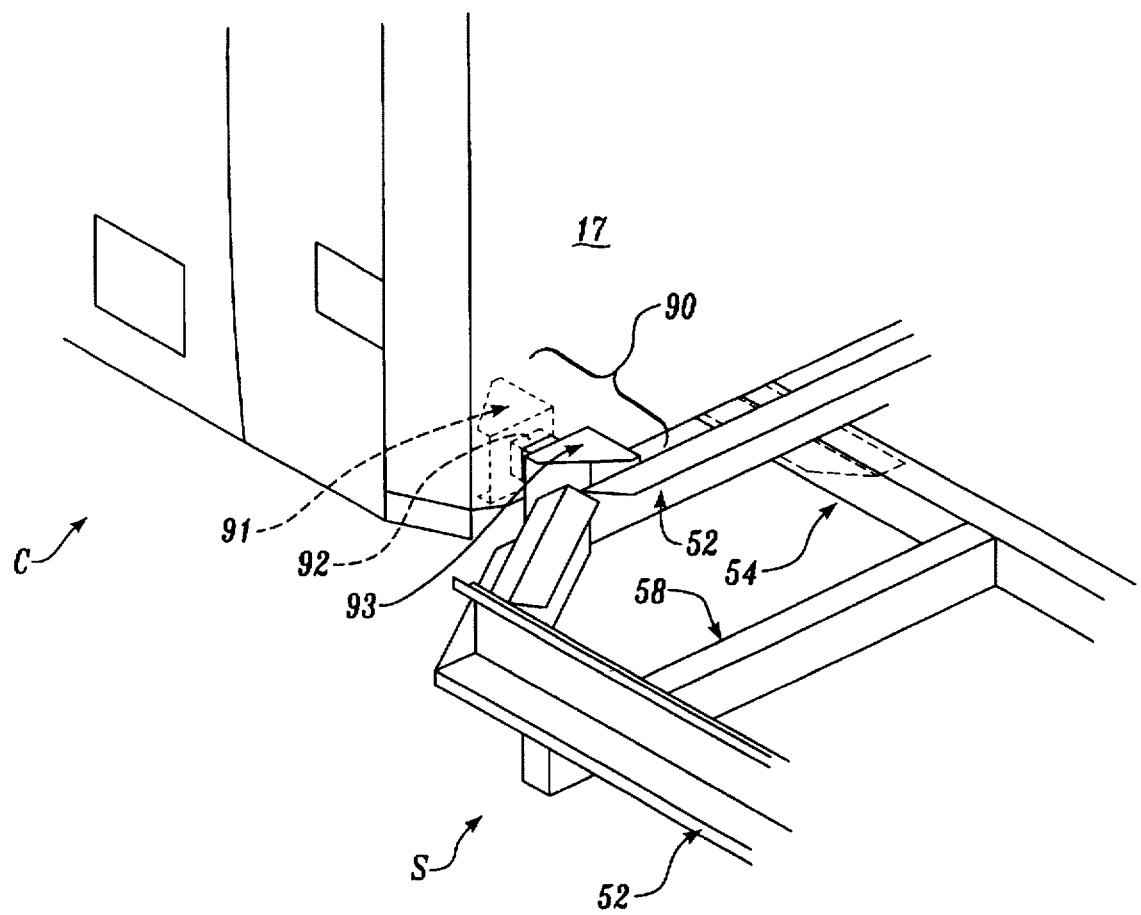
FIG. 5B is a three-quarter rear perspective view of an embodiment of the present invention showing a pair of lower coupling brackets according to the present invention, with portions of the outer cab panels, and all sleeper walls removed to show details.
Figure 5C:
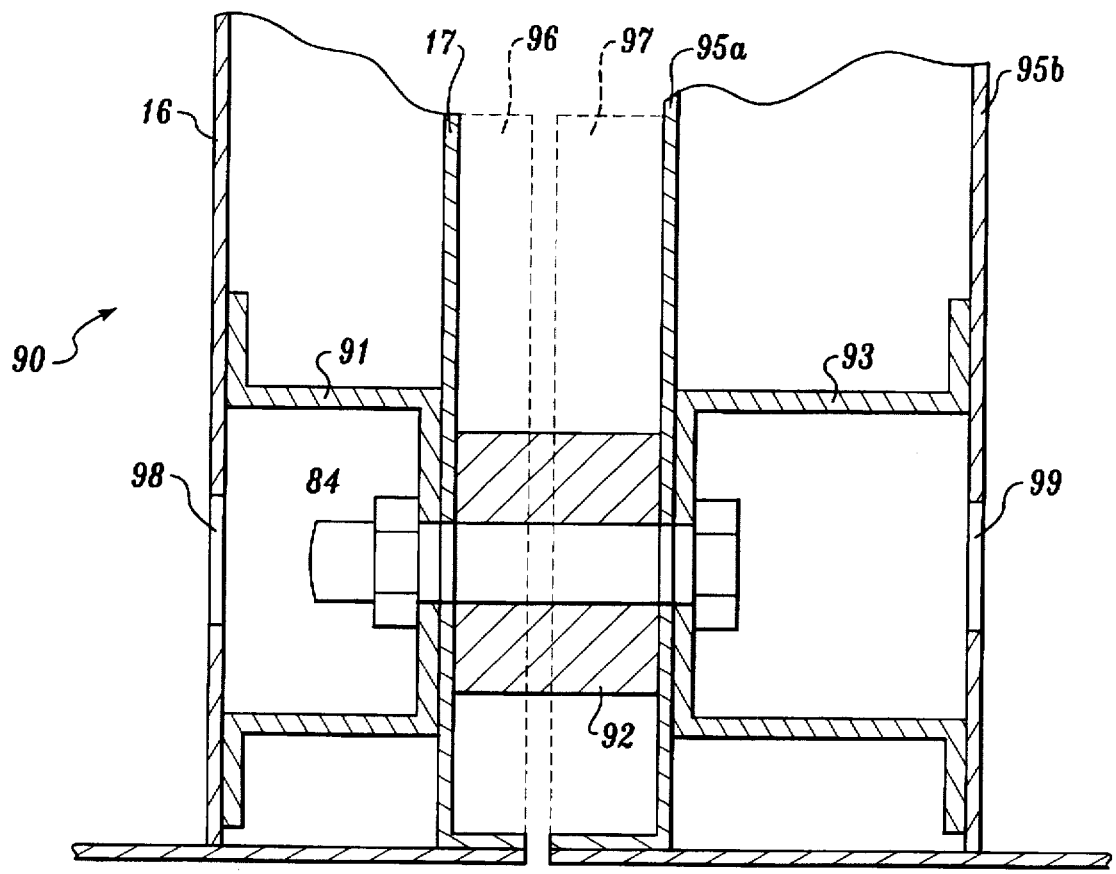
FIG. 5C is an exposed detail schematic view of the pair of lower coupling brackets of FIG. 5B.

Referring to FIG. 5B, the lower corners of the interface between the cab module C and the sleeper module S are also fastened together by couplers 90. As shown, coupler 90 consists of two components, a cab-side component 91, and a sleeper-side component 93. As before, the cab-side component 91 is preferably located between inner rear panel 16 and outer rear panel 17 of cab module C. Likewise, the sleeper-side component 93 is preferably located between sleeper front panel outer wall 95a and sleeper front panel inner wall 95b of the sleeper module S, as shown in FIG. 5C. As discussed above, the cab- and sleeper-side components are spaced apart by a spacer 92, to permit clearance of a cab flange on the cab bodyside with a sleeper flange on the sleeper bodyside. A fastener 84, a nut and bolt, or stud or pin, for example, extends through components 91 and 93.

FIG. 5C illustrates a detailed view of FIG. 5B showing the lower corners of the interface between the cab module C and the sleeper module S as fastened together by couplers 90. Importantly, the elements to be described in reference to FIG. 5B can also be employed to make coupler 80 at an upper corner interface between the cab module C and the sleeper module S is shown in FIG. 5A. Thus, referring to FIG. 5C, component 93 of coupler 90 can be, for example, a cab mounting bracket and component 91 can be, for example, a sleeper mounting bracket. Cab mounting bracket 91 is located between inner rear panel 16 and outer rear panel 17. Likewise, sleeper mounting bracket 93 is located between sleeper front panel outer wall 95a and sleeper front panel inner wall 95b. Spacer 92 spaces outer rear panel 17 from sleeper front panel outer wall 95a such that cab flange 96, which is attached to an exterior edge of outer rear panel 17, and sleeper flange 97, which is attached to an outer edge of sleeper front panel outer wall 95a, do not contact, but preferably have a spacing tolerance of a few millimeters. Fastener 84, which may be, for example, a nut and bolt, stud or pin, is accessible from the cab module C side through cab access opening 98, and is accessible through the sleeper module S side through sleeper access opening 99.

Figure 5D:
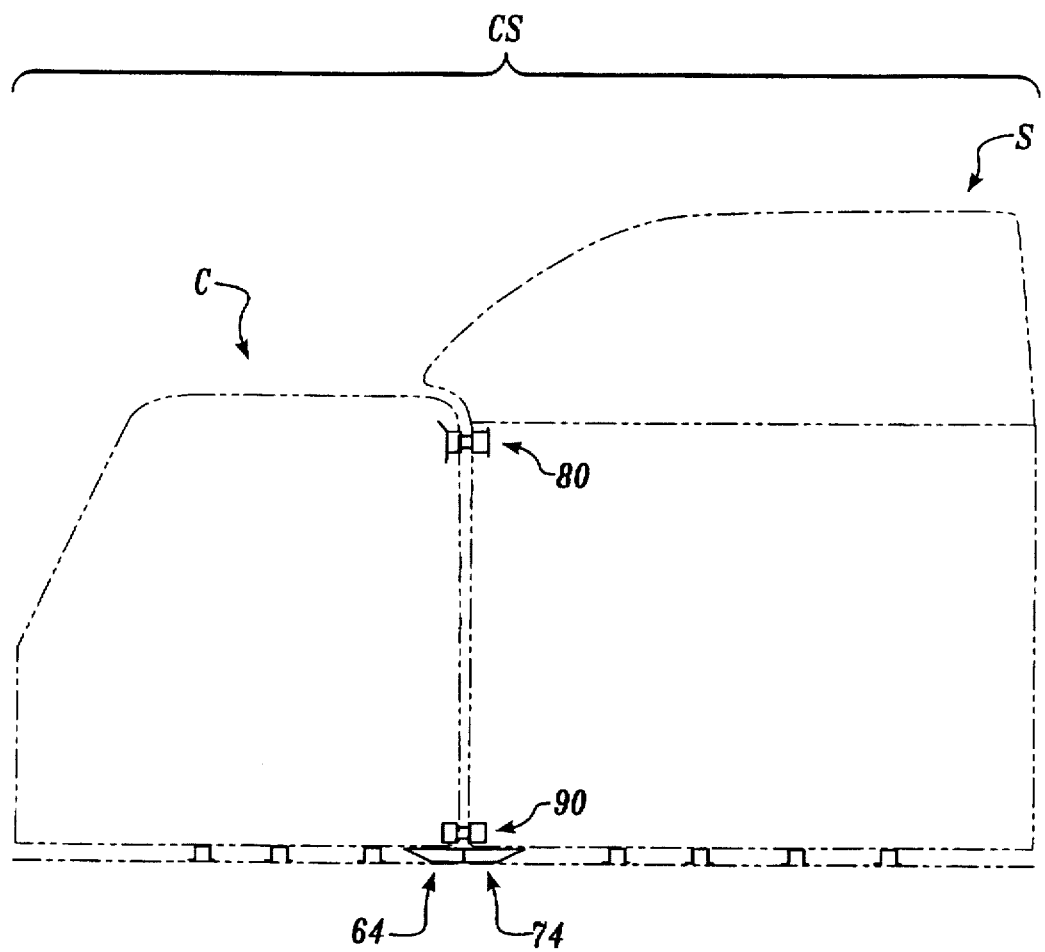
FIG. 5D is a schematic side cross-sectional view of an embodiment of the present invention showing the placements of a pair of upper coupling brackets, and a pair of lower coupling brackets according to the present invention.
Figure 58:
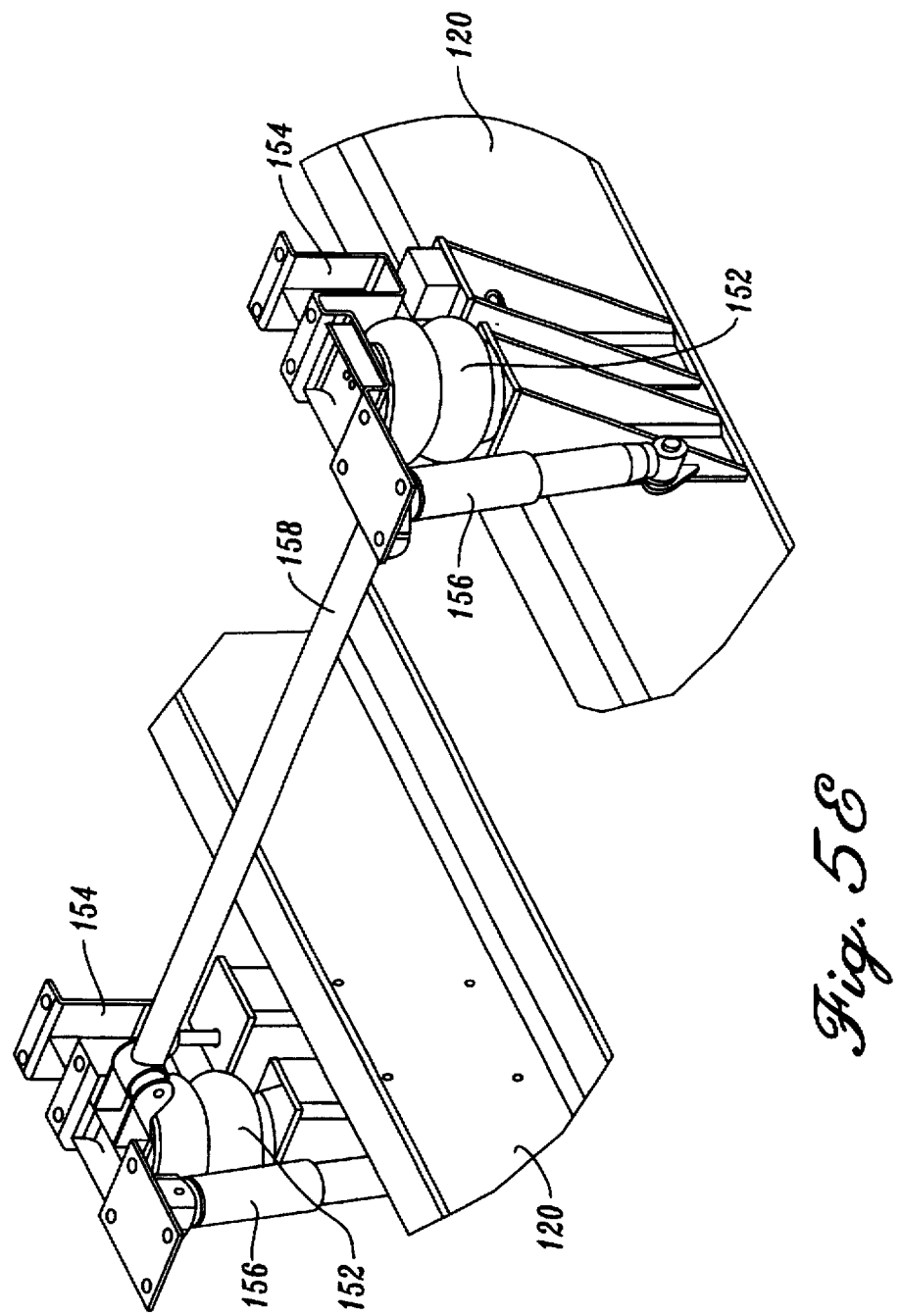

FIG. 5D illustrates schematically the location of the upper and lower couplers, and also indicates the coupling together of the longitudinal members of the cab 32 and the sleeper 54.

Referring to FIG. 2 and FIG. 5E, the cab-sleeper assembly CS of the invention is mounted onto a pair of spaced-apart longitudinally extending support rails 120 of chassis frame 100. These rails 120 are spaced apart to substantially the same extent as the width of the cab-sleeper assembly. Thus, the rails 120 are substantially directly below, and aligned with, lower outboard edges of the cab-sleeper assembly CS, as is conventional in the art. As shown, the cab module C portion of the assembly CS is mounted to rail 120 by a front mount 130, located in the vicinity of the front end of the cab module C. The sleeper portion S of the cab-sleeper assembly CS is mounted to the rail 120 by a sleeper mount 150, that preferably includes a pneumatic rubber ring assembly 152, a bump stop and travel limiting device 154, a shock absorber 156, and a lateral restraint rod 158. Note that one end of lateral restraint rod 158 is connected above one of the pneumatic rubber ring assemblies 152 on one rail 120, and the other end of lateral restraint rod 158 is connected below the other pneumatic rubber ring assembly 152 on the other rail 120. Clearly, the shock absorber 156, while extending from sleeper module to chassis member 120, does not "mount" the sleeper modules to the chassis rail 120. Nor does the bump stop 154 perform the mounting function. Instead, the essential mounting function is performed vertically by the pneumatic rubber ring assembly 152 which also cushions sleeper module S, and in the lateral direction by the lateral restraint rod 158. Therefore, the location of the sleeper mount is measured as the distance between a vertical center line through the pneumatic rubber ring assembly 152, lateral restraint rod 158, and the rear end RS of the sleeper. As indicated above, it is preferred that the mount be located midway between the rear RS of the sleeper, and its front end FS. It has been found that such location of the sleeper mount significantly reduces mechanical stresses, as compared to rear mount of the sleeper advocated in the '239 patent.

While the preferred embodiment of the invention has been illustrated and described, it will be apparent that various changes can be made therein without departing from the spirit and scope of the invention.

The embodiments of the invention in which an exclusive property or privilege is claimed are defined as follows:

1. A unitized cab-sleeper assembly for a truck-tractor vehicle having a separate chassis frame for mounting the cab-sleeper apparatus thereon, the cab-sleeper assembly comprising:

(a) a monocoque cab module adapted for mounting to the chassis frame by at least one pair of first mounts, the at least one pair of first mounts positioned in the vicinity of the front end of the cab module;

(b) a monocoque sleeper module coupled to an aft end of the cab module without an intervening flexible section able to absorb relative motion between the cab and sleeper module, except for an optional thin weatherstrip, the sleeper module adapted for mounting to the chassis frame by at least one pair of second mounts, the at least one pair of second mounts positioned about midway along a length of the sleeper module; and (c) two pairs of couplers coupling the cab module to the sleeper module to form a unitized cab-sleeper module.

2. The cab-sleeper assembly of claim 1, wherein the cab module further comprises a cab floor subframe forming an integral part of the monocoque cab module, and wherein the sleeper module further comprises a sleeper floor subframe forming an integral part of the monocoque sleeper module.

3. The cab-sleeper assembly of claim 2 wherein:

(a) the cab subframe comprises two substantially parallel longitudinal cab members extending from the vicinity of a front end of the cab module to the vicinity of a rear end of the cab module; and (b) the sleeper subframe comprises two substantially parallel sleeper longitudinal members, each extending from the vicinity of a front end of the sleeper to the vicinity of a rear end of the sleeper module, front ends of the sleeper members coupled fixedly to rear ends of the cab members.

4. The cab-sleeper assembly of claim 1, wherein each of the two pairs of couplers comprises:

(a) a first component located adjacent a rear wall of the cab module, and inside the cab module; and (b) a second cooperating component located adjacent a front wall of the sleeper module and inside the sleeper module, the first and second components fastened together to hold the cab rear wall substantially immovably against the sleeper front wall.

5. The cab-sleeper assembly of claim 1, wherein the at least one pair of sleeper mounts comprises a pneumatic rubber ring and a bump stop.

6. The cab-sleeper assembly of claim 1, wherein floors of the cab and sleeper modules comprise a composite having a lightweight core section.

7. The cab-sleeper assembly of claim 1, wherein the cab module comprises a ladderlike subframe in a floor portion thereof.

8. The cab-sleeper assembly of claim 7, wherein the sleeper module comprises a ladderlike subframe in a floor portion thereof.

9. A unitized cab-sleeper assembly for mounting on a chassis of a truck-tractor, the cab-sleeper assembly comprising:

(a) a monocoque cab module having a cab subframe in a floor portion of the cab module; and (b) a monocoque sleeper module having a sleeper subframe in a floor portion of the sleeper module, the sleeper subframe coupled to the cab subframe; and, (c) a pair sleeper mounts, the mounts located on opposite sides of a base of the sleeper module and about midway between a front end and a rear end of the sleeper module;

wherein the cab and sleeper modules are fastened together to form a unitized cab-sleeper assembly without an intervening flexible section able to absorb relative motion between the cab module and the sleeper module, except for an optional thin weather strip.

10. The assembly of claim 9, wherein the cab module and the sleeper module are coupled together with concealed couplers located at each corner of an interface between a rear of the cab module and a front of the sleeper module.

11. The assembly of claim 9, wherein each of the cab and sleeper subframes each comprise a pair of longitudinal members, and an aft end of the cab longitudinal member is coupled to a front end of the sleeper longitudinal member.

12. The assembly of claim 11, wherein the cab module and the sleeper module each comprise a floor of composite material comprising a lightweight core.

13. The assembly of claim 9, wherein the cab and sleeper subframes each comprise a ladderlike structure, and an aft end of the cab ladderlike structure is coupled to a front end of the sleeper ladderlike structure.

14. The assembly of claim 9, wherein the cab module comprises a composite floor.

15. The assembly of claim 9, wherein the sleeper module comprises a composite floor.

16. A cab-sleeper assembly for a truck-tractor vehicle having a separate chassis frame for mounting the cab-sleeper assembly thereon; the cab-sleeper assembly comprising:

(a) a cab section adapted for mounting to the chassis frame by at least one pair of first mounts located near a front end of the cab section, the cab section comprising a subframe in a floor portion thereof, the subframe comprising two longitudinal members extending from a front end of the cab section to a rear end of the cab section; and (b) a sleeper section coupled to a rear end of the cab section to provide access from the cab to the sleeper, the sleeper section adapted for mounting to the chassis frame by at least one pair of mounts located about midway along a length of the sleeper section; the sleeper section comprising a subframe in a floor portion thereof, the sleeper subframe comprising two longitudinal members, the sleeper longitudinal members fixedly coupled to the longitudinal members of the cab section;

wherein the cab section is fixedly coupled to the sleeper section without an intervening flexible section able to absorb relative motion between the cab and sleeper module, except for an optional thin weather strip.

17. The cab-sleeper assembly of claim 16, wherein the cab and sleeper subframes are each of ladderlike construction.

18. The cab-sleeper assembly of claim 16, wherein each of the cab and sleeper sections comprise a composite floor panel.

19. The cab-sleeper assembly of claim 16, comprising couplers at each corner of a cab-sleeper interface to couple the cab section to the sleeper section.

* * * * *